United States Patent
Hara et al.

(10) Patent No.: US 8,892,383 B2
(45) Date of Patent: Nov. 18, 2014

(54) CALIBRATION DEVICE

(75) Inventors: Rokuzo Hara, Tokyo (JP); Shinichi Morita, Tokyo (JP); Hisakazu Maniwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 591 days.

(21) Appl. No.: 13/132,416

(22) PCT Filed: Feb. 12, 2009

(86) PCT No.: PCT/JP2009/052308
§ 371 (c)(1),
(2), (4) Date: Jun. 2, 2011

(87) PCT Pub. No.: WO2010/092673
PCT Pub. Date: Aug. 19, 2010

(65) Prior Publication Data
US 2011/0238355 A1   Sep. 29, 2011

(51) Int. Cl.
*G01C 25/00* (2006.01)
*H04B 17/00* (2006.01)
*H01Q 3/26* (2006.01)

(52) U.S. Cl.
CPC ........... *H04B 17/0062* (2013.01); *H01Q 3/267* (2013.01)
USPC ....................................... 702/104

(58) Field of Classification Search
CPC ................. H04B 17/0062; H04B 7/0634
USPC ....................................... 702/104
See application file for complete search history.

(56) References Cited

U.S. PATENT DOCUMENTS

| | | | |
|---|---|---|---|
| 5,359,333 A * | 10/1994 | Withers, Jr. | 342/378 |
| 7,848,444 B2 * | 12/2010 | Yamaura | 375/267 |
| 2005/0185728 A1 | 8/2005 | Wallace et al. | |
| 2006/0019712 A1 | 1/2006 | Choi | |
| 2006/0072604 A1 | 4/2006 | Sutivong et al. | |
| 2006/0183504 A1 | 8/2006 | Tanaka et al. | |
| 2008/0310529 A1 | 12/2008 | Futatsugi | |
| 2010/0290550 A1 * | 11/2010 | Rietman et al. | 375/260 |

FOREIGN PATENT DOCUMENTS

| | | |
|---|---|---|
| JP | 2005 348235 | 12/2005 |
| JP | 2006 229359 | 8/2006 |
| JP | 2006 295745 | 10/2006 |
| JP | 2008 53803 | 3/2008 |
| JP | 2008 546226 | 12/2008 |

OTHER PUBLICATIONS

Schmidt, R. "Multiple Emitter Location and Signal Parameter Estimation." IEEE Transactions on Antennas and Propagation, vol. AP-34, No. 3. pp. 276-280 (Mar. 1986).

(Continued)

*Primary Examiner* — John Breene
*Assistant Examiner* — Timothy H Hwang
(74) *Attorney, Agent, or Firm* — Oblon, Spivak, McClelland, Maier & Neustadt, L.L.P.

(57) ABSTRACT

In a calibration device, a calibration matrix calculation processing part estimates a calibration matrix by using an orthogonal vector stored in an orthogonal vector storage part and an array mode vector stored in an array mode vector storage part. A calibration matrix output part transmits the calibration matrix computed by the calibration matrix calculation processing part to an unknown parameter estimation device.

8 Claims, 5 Drawing Sheets

(56) References Cited

OTHER PUBLICATIONS

Shan, T.; et al. "On Spatial Smoothing for Direction-of-Arrival Estimation of Coherent Signals." IEEE Transactions on Acoustics, Speech, and Signal Processing, vol. ASSP-33, No. 4. pp. 806-811 (Aug. 1985).

Friedlander, B.; et al. "Direction Finding in the Presence of Mutual Coupling." IEEE Transactions on Antennas and Propagation, vol. 39, No. 3. pp. 273-284 (Mar. 1991).

See, C. "Sensor array calibration in the presence of mutual coupling and unknown sensor gains and phases." Electronics Letters, vol. 30, No. 5. pp. 373-374 (Mar. 1994).

International Search Report issued May 19, 2009 in PCT/JP09/52308 filed Feb. 12, 2009.

Office Action issued Jul. 23, 2014 to European Patent Application No. 09839995.9.

* cited by examiner

CALIBRATION DEVICE

TECHNICAL FIELD

The present invention relates to a calibration device for an unknown parameter estimation device for estimating an unknown parameter from information observed by a plurality of sensors (sensor elements), and more particularly, to a calibration device for an unknown parameter estimation device such as an angle measuring device using an array antenna, a ranging device using a sensor that observes a plurality of frequencies, and an observation device using a plurality of polarization sensors.

BACKGROUND ART

In general, in a device that measures an unknown parameter of a received signal by using a plurality of sensors, it is necessary that a reception channel characteristic of each sensor is measured in advance, or that the reception characteristics of all the sensors are so calibrated as to be identical with each other. For that reason, it is necessary that observation data corresponding to the unknown parameter is observed, and the reception channel characteristic of each sensor is measured or calibrated.

As a related art to the unknown parameter estimation device, there is a multiple signal classification (MUSIC) method (for example, refer to Non-patent Document 1). In the related art using the MUSIC method, when a plurality of signals to be observed is high in correlation, for example, processing disclosed in Non-patent Document 2 needs to be conducted in a prestage.

Under such circumstances, in order to apply the pre-processing disclosed in Non-patent Document 2, it is necessary to use an observation device in which all of the sensors are identical in reception channel characteristic with each other, or a calibration device for calibrating the reception channel characteristics of all the sensors to be identical with each other. Because the former observation device is difficult to realize, the latter calibration device is generally used.

Further, as a related art that realizes the calibration device, there are, for example, devices disclosed in Non-patent Document 3 and Non-patent Document 4. In those related arts, a calibration matrix is estimated, which expresses, as a matrix, a plurality of calibration parameters for making the reception characteristics of the plurality of sensors identical with each other.

Non-patent Document 1: R. O. Schmidt, "Multiple emitter location and signal parameter estimation," IEEE Trans. Antennas and Propagation, vol. AP-34, no. 3, pp. 276-280, March 1986 Non-patent Document 2: T. Shan, M. Wax, T. Kailath, "On spatial smoothing for direction-of-arrival estimation of coherent signals," IEEE Trans. Acoustics, Speech and Signal Processing, vol. 33, no. 4, pp. 806-811, August 1985

Non-patent Document 3: B. Friedlander, A. J. Weiss, "Direction finding in the presence of mutual coupling," IEEE Trans. Antennas and Propagation, vol. 39, no. 3, pp. 273-284, March 1991 Non-patent Document 4: C. M. S. See, "Sensor array calibration in the presence of mutual coupling and unknown sensor gains and phases," Electronics Letters, vol. 30, pp. 373-374, March 1994

DISCLOSURE OF THE INVENTION

Problems to be Solved by the Invention

FIG. 5 is a block diagram illustrating a configuration of a conventional calibration device. A calibration device 500 illustrated in FIG. 5 is the related art disclosed in Non-patent Document 3. Referring to FIG. 5, the calibration device 500 is connected to a plurality of (L: arbitrary number) sensors 1A to 1L. The sensors 1A to 1L constitute, for example, an array antenna. Further, the calibration device 500 receives observation data (signals) from the plurality of sensors 1A to 1L.

Further, the calibration device 500 includes an observation data vector generation processing part 501, an orthogonal vector calculation processing part 502, an orthogonal vector storage part 503, a database part 504, a calibration matrix calculation processing part 505, and a calibration matrix output part 506.

The observation data vector generation processing part 501 generates an observation data vector based on observation data received from the sensors 1A to 1L. The orthogonal vector calculation processing part 502 receives the observation data vector from the observation data vector generation processing part 501. Further, the orthogonal vector calculation processing part 502 calculates an orthogonal vector from the received observation data vector every time the observation data vector is received. The orthogonal vector storage part 503 can store a plurality of orthogonal vectors calculated by the orthogonal vector calculation processing part 502.

The database part 504 includes an array mode vector storage part 504a. The array mode vector storage part 504a stores in advance a plurality of array mode vectors $a(\theta)$ in association with observation data vectors r each obtained by observing a single signal of a parameter (angle) $\theta$ and the parameters $\theta$.

The calibration matrix calculation processing part 505 estimates a matrix W representing an influence of an observation error from the following Equation (1) with the use of the orthogonal vectors stored in the orthogonal vector storage part 503, and the array mode vectors $a(\theta)$ stored in the array mode vector storage part 504a. The reason that the matrix W is estimated as represented by Equation (1) is based on a physical characteristic of the observation error according to the disclosure of Non-patent Document 3.

[Eq. 1]

$$e^H W a(\theta) = 0 \tag{1}$$

where e is an orthogonal vector obtained from the observation data vector r. An index H is a complex conjugate transposition.

Further, the calibration matrix calculation processing part 505 calculates a calibration matrix M for calibrating the influence of the observation error through an inverse matrix operation of the matrix W as represented by a relationship of the following Equation (2). The calibration matrix M is a matrix made up of a plurality of calibration parameters.

[Eq. 2]

$$M = W^{-1} \tag{2}$$

The calibration matrix output part 506 transmits the calibration matrix M calculated by the calibration matrix calculation processing part 505 to an unknown parameter estimation device (not shown). The unknown parameter estimation device is, for example, an angle measuring device, a ranging device, or an observation device.

In the conventional calibration device 500 illustrated in FIG. 5, the orthogonal vector calculation processing part 502 sequentially calculates the orthogonal vector based on the observation data vector. The calibration matrix calculation processing part 505 executes the inverse matrix operation of the matrix W to calculate the calibration matrix M. For that reason, in the conventional calibration device 500, it is necessary to execute the inverse matrix operation to a matrix of a size corresponding to the number of sensors or more, or execute an eigenvalue calculation operation a plurality of times. As a result, the conventional calibration device 500 suffers from such problems that an operation load and a device scale become relatively large, and the manufacturing costs increase.

The present invention has been made to solve the above-mentioned problems, and has an object to provide a calibration device that can suppress an increase in device scale and reduce the manufacturing costs.

Means for Solving the Problems

According to the present invention, there is provided a calibration device for calibrating observation data received by a plurality of sensors, the calibration device including: an observation data vector generation processing part that receives the observation data from the plurality of sensors to generate an observation data vector from the received observation data; a mode vector association processing part capable of calculating or storing in advance a mode vector corresponding to the observation data vector, and of storing an orthogonal vector in association with the mode vector; and a calibration parameter calculating part that acquires the observation data vector from the observation data vector generation processing part, acquires the orthogonal vector to the mode vector corresponding to the acquired observation data vector from the mode vector association processing part, and calculates a plurality of calibration parameters for calibrating an observation error included in the observation data vector from the acquired orthogonal vector and the observation data vector.

BEST MODES FOR CARRYING OUT THE INVENTION

Hereinafter, preferred embodiments of the present invention is described with reference to the drawings.

First Embodiment

Figure 1:
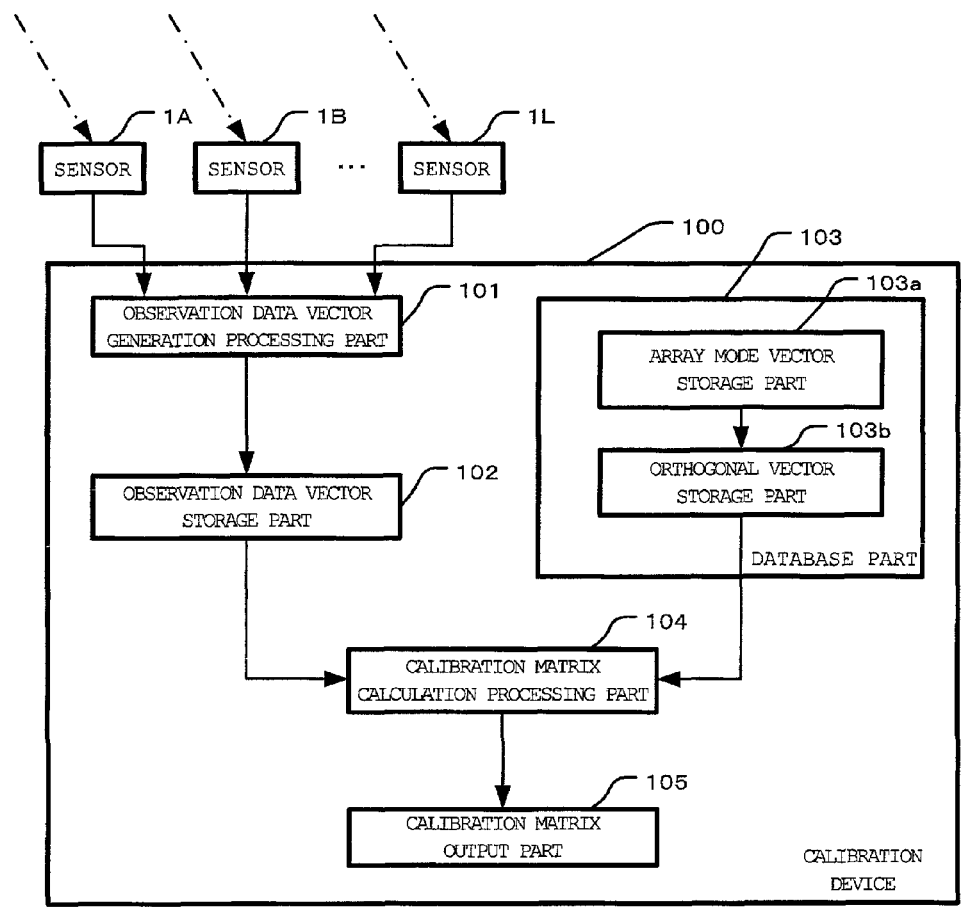
FIG. 1 is a block diagram illustrating a calibration device according to a first embodiment of the present invention.

FIG. 1 is a block diagram illustrating a calibration device according to a first embodiment of the present invention.

Referring to FIG. 1, a calibration device 100 is connected to a plurality of (L: an arbitrary number) sensors 1A to 1L. The sensors 1A to 1L constitute, for example, an array antenna. Further, the calibration device 100 receives observation data (observation signals) from the plurality of sensors 1A to 1L.

Further, the calibration device 100 includes an observation data vector generation processing part 101, an observation data vector storage part 102, a database part 103 as a mode vector association processing part, a calibration matrix calculation processing part 104 as a calibration parameter calculating part, and a calibration matrix output part 105. The observation data vector generation processing part 101 generates observation data vectors from the observation data from the sensors 1A to 1L. The observation data vector storage part 102 can store a plurality of observation data vectors received from the observation data vector generation processing part 101 therein.

The database part 103 includes an array mode vector storage part 103a and an orthogonal vector storage part 103b. The array mode vector storage part 103a stores in advance a plurality of array mode vectors $a(\theta)$ in association with observation data vectors r each obtained by observing a single signal of a parameter (angle) $\theta$, and the parameters $\theta$. The orthogonal vector storage part 103b stores orthogonal vectors to the plurality of array mode vectors $a(\theta)$ in association with the parameters $\theta$ therein in advance. Accordingly, the database part 103 stores the array mode vectors $a(\theta)$ and the orthogonal vectors thereto therein in advance.

The calibration matrix calculation processing part 104 estimates the calibration matrix M from a relationship represented by the following Equation (3) by using the orthogonal vectors stored in the orthogonal vector storage part 103b, and the array mode vectors $a(\theta)$ stored in the array mode vector storage part 102.

[Eq. 3]

$$v^H M r = 0 \tag{3}$$

where v is the orthogonal vectors of the array mode vectors $a(\theta)$.

The calibration matrix output part 105 transmits the calibration matrix M calculated by the calibration matrix calculation processing part 104 to an unknown parameter estimation device (not shown). The unknown parameter estimation device is, for example, an angle measuring device, a ranging device, or an observation device.

The calibration device 100 can be configured by a computer (not shown) including an arithmetic processing unit (CPU), a storage device (ROM, RAM, and hard disk), and a signal input/output device. In the storage device in the computer of the calibration device 100, there are stored programs for realizing the functions of the observation data vector generation processing part 101, the observation data vector storage part 102, the database part 103, the calibration matrix calculation processing part 104, and the calibration matrix output part 105.

Figure 5:
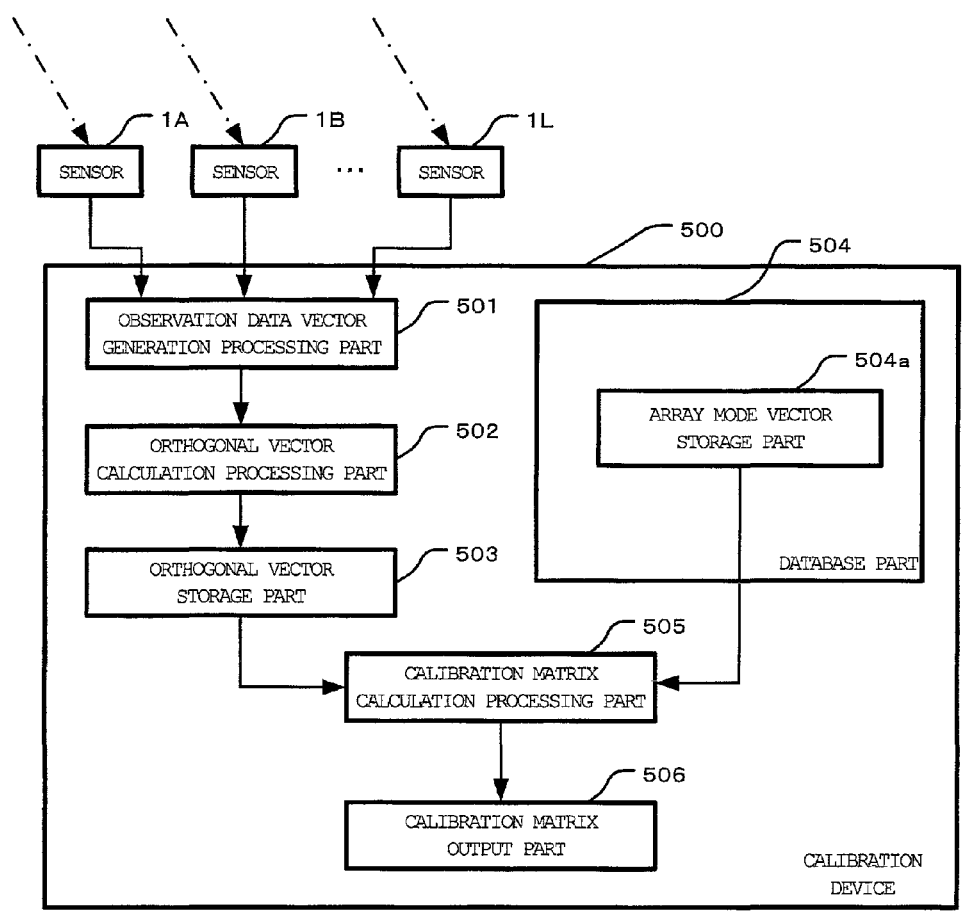
FIG. 5 is a block diagram illustrating a conventional calibration device.

As described above, according to the calibration device 100 of the first embodiment, the array mode vectors $a(\theta)$ are known information, and hence the orthogonal vector can be calculated in advance. For that reason, the orthogonal vectors v of the array mode vectors $a(\theta)$ are registered in the orthogonal vector storage part 103b of the database part 103 in advance. As a result, unlike the conventional calibration device 500 illustrated in FIG. 5, it is unnecessary to calculate the orthogonal vectors directly based on the observation data vectors. Accordingly, in the calibration device 100 of the first embodiment, an increase in operation load and an increase in device scale can be suppressed, and the manufacturing costs can be reduced.

In the related art disclosed in Non-patent Document 4, the calibration matrix M is estimated directly without using the orthogonal vector. However, in this case, because a matrix of a size larger than the number of sensors L is subjected to the inverse matrix operation or the like, a relatively large amount of operation is required, resulting in a relatively increased operation load. On the contrary, in the calibration device 100 of the first embodiment, the orthogonal vectors are stored in the database part 103. For that reason, no eigenvalue calculation operation is conducted on the orthogonal vectors. As a result, as compared with the related art disclosed in Non-patent Document 4, the occurrence frequency of the eigenvalue calculation operation as the entire calibration device 100 can be reduced.

Second Embodiment

First, when a plurality of signals to be observed is high in correlation as in the related art of Non-patent Document 1, pre-processing is conducted, for example, as disclosed in Non-patent Document 2. For that reason, the plurality of sensors may be required to have, as a condition, the same observation characteristic with respect to the parameter θ. Under such a condition, the orthogonal vector can be calculated according to the array mode vectors a(θ) and a Fourier coefficient.

In a calibration device 200 according to a second embodiment of the present invention, the array mode vectors a(θ) and the Fourier coefficient are stored in a database part 203. Further, in the calibration device 200, the array mode vectors a(θ) and the Fourier coefficient are used for calculation of the orthogonal vectors of the array mode vectors a(θ).

Subsequently, a method of calculating the orthogonal vector according to the second embodiment is described in detail. Here, as an example, a case in which the number of sensors is four is described. Three orthogonal vectors $v_l$ ($l=1, \ldots, 3$) orthogonal to the array mode vectors a(θ) are obtained by the following Equations (4) to (6).

[Eq. 4]

$$v_l = a(\theta) \otimes f_l \qquad (4)$$

where $l=1, \ldots, 3$. $\otimes$ is a multiplication between elements.

$$\mathfrak{J} = \begin{bmatrix} 1 & 1 & 1 & 1 \\ 1 & \phi^1 & \phi^2 & \phi^3 \\ 1 & \phi^2 & \phi^4 & \phi^6 \\ 1 & \phi^3 & \phi^6 & \phi^9 \end{bmatrix} \qquad (5)$$

$$= [f_0 \ f_1 \ f_2 \ f_3]$$

$$\phi = \exp\left(j\frac{2\pi}{4}\right) \qquad (6)$$

Subsequently, simultaneous equations are observation data vectors $r_k$ obtained by separately observing signals of a plurality of parameters $\theta_k$ ($k=1, \ldots K$), establish, and when the orthogonal vector $v_l$ is expressed by the array mode vector a(θ) and the vector $f_l$, the above Equation (3) is represented by the following Equation (7). A matrix F, a matrix A, and a matrix D, which constitute Equation (7), are represented by the following Equations (8) to (10).

[Eq. 5]

$$F^H\{A^* \otimes MD\} = 0 \qquad (7)$$

$$F = [f_1 f_2 f_3] \qquad (8)$$

$$A = [a(\theta_1) a(\theta_2) \ldots a(\theta_K)] \qquad (9)$$

$$D = [r_1 r_2 \ldots r_K] \qquad (10)$$

where an index * indicates a complex conjugate.

When direct estimation of the calibration matrix M is attempted based on the above Equation (7), because a left pseudo-inverse matrix of the matrix $F^H$ is not uniquely determined, and there is inverse matrix operation with the number of sensors as dimensions, arithmetic processing becomes difficult. Therefore, when the matrix F, the matrix A, the calibration matrix M, and the matrix D, which constitute Equation (7), are divided, the following Equations (11a) to (11c) are obtained. The matrix F, the matrix A, the calibration matrix M, and the matrix D, which constitute Equations (11a) to (11c), are obtained as the following Equations (12) to (15).

[Eq. 6]

$$\begin{bmatrix} F_1 \\ F_2 \end{bmatrix}^H \left\{ \begin{bmatrix} A_1 \\ A_1 \end{bmatrix}^* \otimes \begin{bmatrix} M_{11} & M_{12} \\ M_{21} & M_{22} \end{bmatrix} \begin{bmatrix} D_1 \\ D_2 \end{bmatrix} \right\} = 0 \qquad (11a)$$

$$\begin{bmatrix} F_1 \\ F_2 \end{bmatrix}^H \begin{bmatrix} A_1^* \otimes (M_{11}D_1 + M_{12}D_2) \\ A_2^* \otimes (M_{21}D_1 + M_{22}D_2) \end{bmatrix} = 0 \qquad (11b)$$

$$F_1^H\{A_1^* \otimes (M_{11}D_1 + M_{12}D_2)\} + F_2^H\{A_2^* \otimes (M_{21}D_1 + M_{22}D_2)\} = 0 \qquad (11c)$$

$$F = \begin{bmatrix} F_1 \\ F_2 \end{bmatrix} \qquad (12)$$

$$A = \begin{bmatrix} A_1 \\ A_2 \end{bmatrix} \qquad (13)$$

$$M = \begin{bmatrix} M_{11} & M_{12} \\ M_{21} & M_{22} \end{bmatrix} \qquad (14)$$

$$D = \begin{bmatrix} D_1 \\ D_2 \end{bmatrix} \qquad (15)$$

Further, elements of the calibration matrix M are expressed by the following Equations (16) to (19) as a matrix $M_{11}$, a matrix $M_{12}$, a matrix $M_{21}$, and a matrix $M_{22}$, based on Equations (11a) to (11c). A relationship of the respective matrixes in Equations (16) to (19) satisfies the following Equations (20) to (27).

[Eq. 7]

$$M_{11}\{P_1 - M_{12}D_2\}Q_1 \qquad (16)$$

$$M_{12} = \{P_1 - M_{11}D_1\}Q_2 \qquad (17)$$

$$M_{21}\{P_2 - M_{22}D_2\}Q_1 \qquad (18)$$

$$M_{22} = \{P_2 - M_{21}D_1\}Q_2 \qquad (19)$$

$$P_1 = -\{U_1 B_2\} \oslash A_1^* \qquad (20)$$

$$P_2 = -\{U_2 B_1\} \oslash A_2^* \qquad (21)$$

$$Q_1 = D_1^H\{D_1 D_1^H\}^{-1} \qquad (22)$$

$$Q_2 = D_2^H\{D_2 D_2^H\}^{-1} \qquad (23)$$

$$U_1 = \{F_1 F_1^H\}^{-1} F_1 F_2^H \qquad (24)$$

$$U_2 = \{F_2 F_2^H\}^{-1} F_2 F_1^H \qquad (25)$$

$$B_1 = A_1^* \otimes (M_{11}D_1 + M_{12}D_2) \qquad (26)$$

$$B_2 = A_2^* \otimes (M_{21}D_1 + M_{22}D_2) \qquad (27)$$

where ⊘ is a division of the elements.

That is, the calibration matrix M is divided into the matrix $M_{11}$, the matrix $M_{12}$, the matrix $M_{21}$, and the matrix $M_{22}$ as a plurality of given matrixes. Further, in Equations (16) to (19), values of three matrixes in the matrix $M_{11}$, the matrix $M_{12}$, the matrix $M_{21}$, and the matrix $M_{22}$ are fixed, and one remaining matrix is estimated. The estimate operations of Equations (16) to (19) are repetitively calculated in turns. A unit matrix I is used as an initial value of the calibration matrix M in the repetitive estimation.

Finally, the matrix $M_{11}$ (hat), the matrix $M_{12}$ (hat) the matrix $M_{21}$ (hat), and the matrix $M_{22}$ (hat), which have been repetitively estimated, are used to calculate such the following Equation (28), the calibration matrix M(hat) which is an estimated value of the calibration matrix M (here, M(hat) means that "^" is added to a top of the symbol M, and is representative of the estimated value.). That is, the respective matrixes are repetitively estimated from a mutual relationship of the respective matrixes based on Equations (16) to (19), and the respective matrixes that are repetitively estimated are used to estimate the calibration matrix M(hat).

[Eq. 8]

$$\hat{M} = \begin{bmatrix} \hat{M}_{11} & \hat{M}_{12} \\ \hat{M}_{21} & \hat{M}_{22} \end{bmatrix} \quad (28)$$

Figure 2:
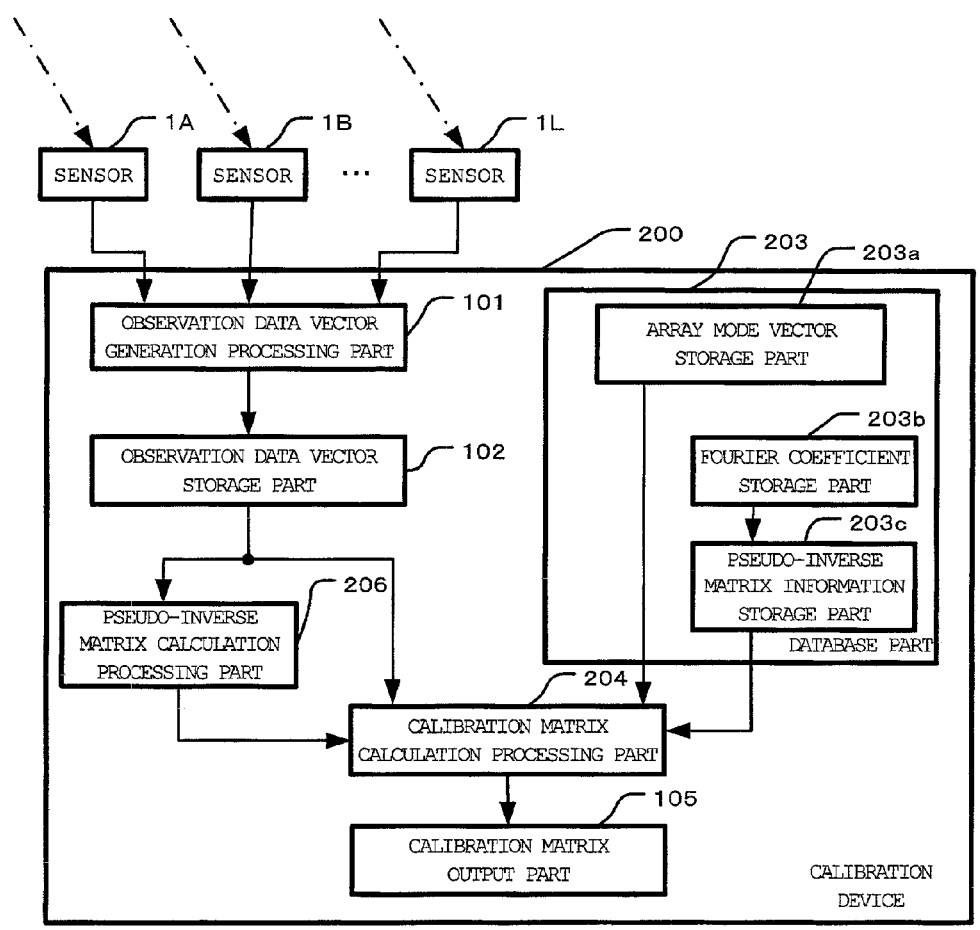
FIG. 2 is a block diagram illustrating a calibration device according to a second embodiment of the present invention.

FIG. 2 is a block diagram illustrating a calibration device according to the second embodiment of the present invention. Referring to FIG. 2, the calibration device 200 according to the second embodiment includes the respective functions 101, 102, and 105 of the calibration device 100 according to the first embodiment. Further, the calibration device 200 includes the database part 203 instead of the database part 103 of the calibration device 100 according to the first embodiment. Further, the calibration device 200 has a calibration matrix calculation processing part (improved calibration matrix calculation processing part) 204 instead of the calibration matrix calculation processing part 104 of the calibration device 100 according to the first embodiment. Further, the calibration device 200 further includes a pseudo-inverse matrix calculation processing part 206.

The database part 203 includes an array mode vector storage part 203a that is the same as the array mode vector storage part 103a according to the first embodiment, a Fourier coefficient storage part 203b, and a pseudo-inverse matrix information storage part 203c. The Fourier coefficient storage part 203b stores information corresponding to the matrix F in the above Equation (8) therein in advance. The pseudo-inverse matrix information storage part 203c stores information corresponding to the matrix $U_1$ and the matrix $U_2$ in the above Equations (24) and (25) therein in advance. Accordingly, the database part 203 stores the information corresponding to the array mode vectors and the matrix F, and the information corresponding to the matrixes $U_1$ and $U_2$ therein in advance.

The pseudo-inverse matrix calculation processing part 206 executes the arithmetic processing of the above Equations (22) and (23) by using the observation data vectors stored in the observation data vector storage part 102. The calibration matrix calculation processing part 204 executes the arithmetic processing of the above Equations (16) to (21) by using the observation data vector stored in the observation data vector storage part 102, the calculated value obtained by the pseudo-inverse matrix calculation processing part 206, and the information stored in the database part 203 to acquire the calibration matrix M(hat). The other components are identical with those in the first embodiment.

As described above, according to the calibration device 200 of the second embodiment, the array mode vectors $a(\theta)$ and the Fourier coefficient are stored in the database part 203 in advance. Further, the orthogonal vector is calculated from the array mode vectors $a(\theta)$ and the Fourier coefficient by the calibration matrix calculation processing part 204. As a result, even when plural pieces of observation data are high in correlation, the orthogonal vector can be calculated with a relatively small amount of calculation.

Further, the calibration matrix M is divided and estimated, resulting in advantages that a matrix $F_1^H$ and a matrix $F_2^H$ deviated from the matrix $F^H$ have the left pseudo-inverse matrix, and the size of the matrix that conducts the inverse matrix operation in Equations (22) to (25) is smaller than the number of sensors.

Further, the inverse matrix operation necessary for estimating the calibration matrix M is conducted only twice with the above Equations (22) and (23), and there is no eigenvalue calculation operation. As a result, the same advantages as those of the calibration device in the first embodiment can be obtained also in the calibration device according to the second embodiment.

In the second embodiment, the array mode vectors $a(\theta)$ and the Fourier coefficient are stored in the database part 203 in advance. However, the present invention is not limited to this example, and at least one of the array mode vectors $a(\theta)$ and the Fourier coefficient may not be stored in the database in advance but may be sequentially calculated. In this case, the calibration matrix calculation processing part 204 may sequentially compute the above Equations (5) and (6). That is, the database part 203 may be omitted, and the calibration matrix calculation processing part 204 may have a function of the mode vector association processing part.

Third Embodiment

First, in the related art of Non-patent Document 4, in order to improve a signal-to-noise ratio of the observation data vectors r, eigenvalue vectors corresponding to the signal components are calculated from a correlation matrix R of the observation data vectors r based on the following Equation (29). However, in the related art of Non-patent Document 4, the signal-to-noise ratio of the observation data vectors r is improved, but the eigenvalue vector is thus calculated. For that reason, in the related art of Non-patent Document 4, the eigenvalue calculation operation of the matrix having a size corresponding to the number of sensors is conducted a plurality of times, and the operation load is relatively large.

[Eq. 9]

$$R = E[rr^H] \quad (29)$$

where E[ ] is an ensemble average.

On the contrary, in a calibration device 300 according to a third embodiment, a matrix R(bar) based on the correction matrix R is calculated through arithmetic processing of the following Equation (30) (here, R(bar) means "−" is added to a top of symbol R.). Information corresponding to one arbitrary column (given matrix element) in the matrix R(bar) based on the correlation matrix R is used to improve the signal-to-noise ratio of the observation data vector r.

[Eq. 10]

$$\bar{R} = R - \sigma_N^2 I \quad (30)$$

where $\sigma_N^2$ is a noise power. Note that, when the noise power $\sigma_N^2$ is estimated by the unknown parameter estimation device, the estimated value can be diverted as the noise power $\sigma_N^2$.

In this example, a definition of the information corresponding to one arbitrary column in the matrix R(bar) is based on a fact that the amount of information carried by one arbitrary column in the matrix R(bar) is equivalent to the amount of information carried by the amount of information provided to one arbitrary row. That is, even if how to use the element in the matrix R(bar) is different, the information corresponds to one arbitrary column. When the signal-to-noise ratio is sufficiently large, the noise power $\sigma^2_N$ can be ignored. Further, entire information may be manipulated so that a specific element of information corresponding to one arbitrary column becomes a given power.

Figure 3:
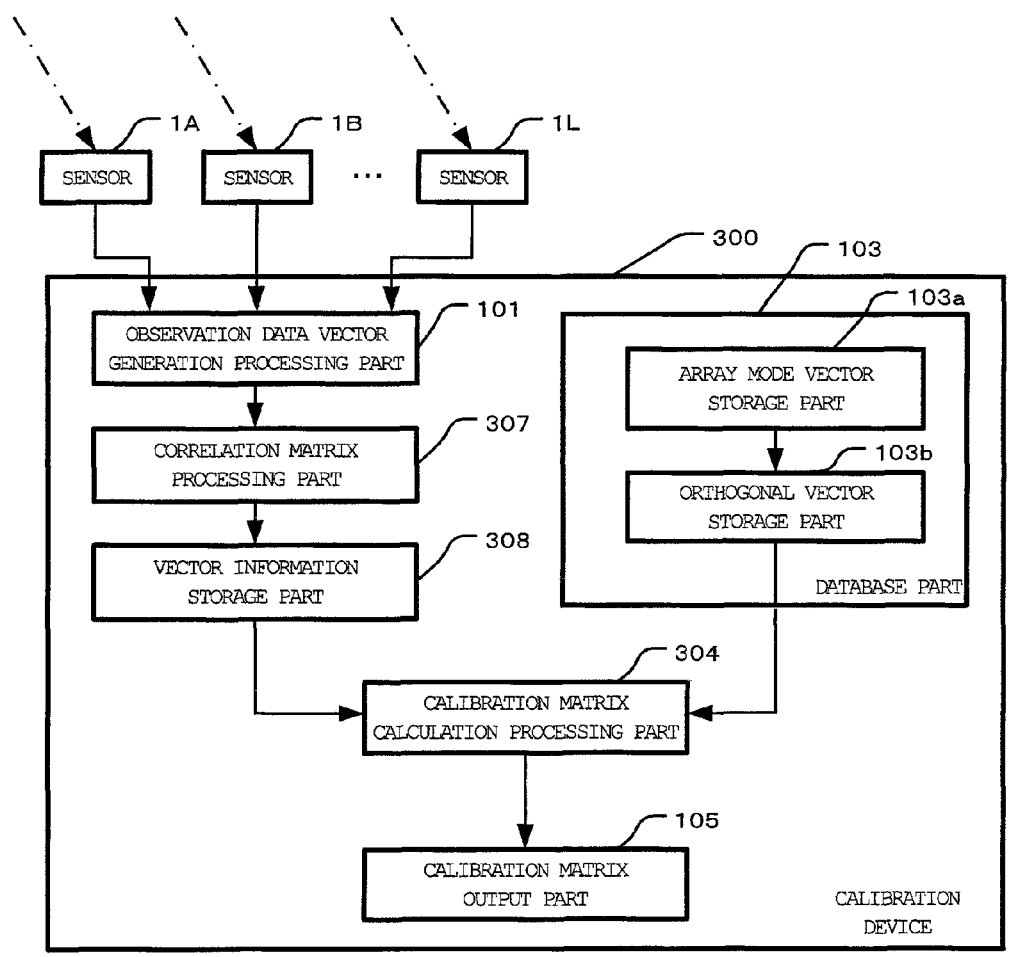
FIG. 3 is a block diagram illustrating a calibration device according to a third embodiment of the present invention.

FIG. 3 is a block diagram illustrating a configuration of a calibration device according to the third embodiment of the present invention. Referring to FIG. 3, the calibration device 300 according to the third embodiment includes the respective functions 101, 103, and 105 of the calibration device 100 according to the first embodiment. Further, the calibration device 300 includes a calibration matrix calculation processing part 304 instead of the calibration matrix calculation processing part 104 of the calibration device 100 according to the first embodiment. Further, the calibration device 300 has a correlation matrix processing part 307. Further, the calibration device 300 includes a vector information storage part 308 instead of the observation data vector storage part 102 of the calibration device 100 according to the first embodiment.

The correlation matrix processing part 307 executes arithmetic processing of the above Equation (29) by using the observation data vectors r generated by the observation data vector generation processing part 101 to calculate the correlation matrix R. Further, the correlation matrix processing part 307 executes the arithmetic processing of the above Equation (30), calculates the matrix R(bar) obtained by removing an influence of noise from the correlation matrix R, and extracts and outputs information corresponding one arbitrary column in the matrix R(bar). That is, the correlation matrix processing part 307 extracts a given matrix element in the matrix R(bar).

The vector information storage part 308 receives information corresponding to one arbitrary column in the matrix R(bar). The vector information storage part 308 can store plural pieces of information corresponding to one arbitrary column in the matrix R(bar).

A calibration matrix calculation processing part 304 acquires information corresponding to one arbitrary column in the matrix R (bar) based on the correlation matrix R. The other functions of the calibration matrix calculation processing part 304 are identical with those of the calibration matrix calculation processing part 104 according to the first embodiment. Further, the other components of the calibration device 300 are identical with those of the calibration device 100 according to the first embodiment.

As described above, according to the calibration device of the third embodiment, the eigenvalue calculation operation of a matrix having a size corresponding to the number of sensors as disclosed in Non-patent Document 4 is not required, with the result that the signal-to-noise ratio of the observation data vector r can be improved by relatively simple processing.

The third embodiment is described based on the calibration device 100 of the first embodiment. However, the present invention is not limited to this example, but the respective functions 302, 307, and 308 of the calibration device 300 according to the third embodiment may be applied to the calibration device 200 according to the second embodiment.

Fourth Embodiment

First, in the second embodiment, the matrix $U_1$ of Equation (24) and the matrix $U_2$ of Equation (25) are stored in the database part 203 in advance. Because the matrix $U_1$ and the matrix $U_2$ are constant matrixes, instead of storing information in a database part 403, the matrix $U_1$ and the matrix $U_2$ may be calculated in a process of the calibration matrix calculation processing by a calibration matrix calculation processing part 404. In particular, when the sizes of the matrix $U_1$ and the matrix $U_2$ are equal to each other, the matrix $U_1$ and the matrix $U_2$ are mathematically the same value, and have the characteristics of the following Equation (31).

[Eq. 11]

$$U_1 = U_2 \qquad (31)$$
$$= -\frac{2}{L}\begin{bmatrix} 1 & \cdots & 1 \\ \vdots & \ddots & \vdots \\ 1 & \cdots & 1 \end{bmatrix}$$

That is, the matrix operation of $U_1B_2$ in the above Equation (20) can be replaced with processing (averaging processing) for calculating an average value of the respective column elements of a matrix $B_2$. Likewise, the matrix operation of $U_2B_1$ in the above Equation (21) can be replaced with processing (averaging processing) of calculating an average value of the respective column elements of a matrix $B_1$. Note that, those replacements can be conducted even if the sizes of the matrix $U_1$ and the matrix $U_2$ are different from each other.

Figure 4:
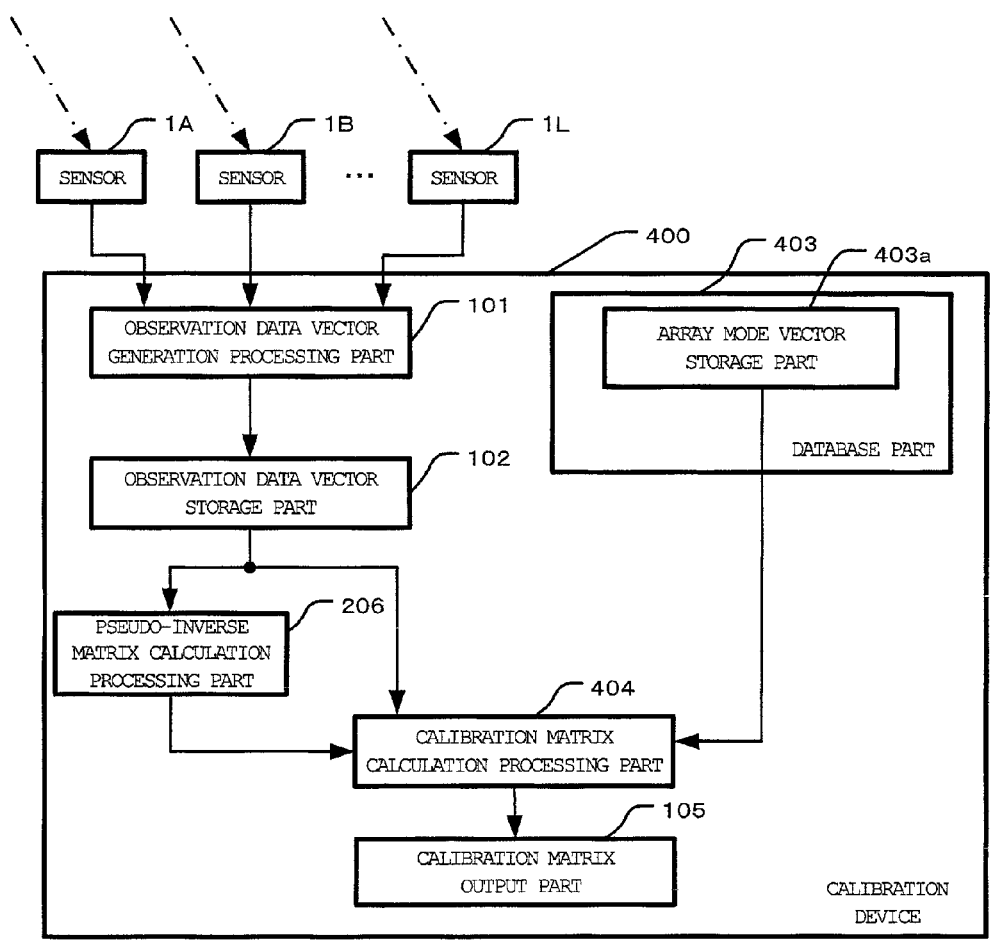
FIG. 4 is a block diagram illustrating a calibration device according to a fourth embodiment of the present invention.

Next, FIG. 4 is a block diagram illustrating a calibration device 400 according to a fourth embodiment of the present invention. Referring to FIG. 4, the calibration device 200 includes the respective functions 101, 102, and 105 of the calibration device 100 according to the first embodiment and the function 206 of the calibration device 200 according to the second embodiment. Further, the calibration device 400 includes the database part 403 instead of the database part 203 of the calibration device 200 according to the second embodiment. The database part 403 includes an array mode vector storage part 403a that is similar to the array mode vector storage part 203a of the second embodiment.

Further, the calibration device 400 has a calibration matrix calculation processing part (averaging improvement calibration matrix calculation processing part) 404 instead of the calibration matrix calculation processing part 204 of the calibration device 200 according to the second embodiment. The calibration matrix calculation processing part 404 replaces the matrix operation $U_1B_2$ (given element) with averaging processing of the respective column elements of the matrix $B_2$ to execute arithmetic processing, in the arithmetic processing based on the above Equations (16) to (21) by the calibration matrix calculation processing part 204 of the second embodiment. Together with this operation, the calibration matrix calculation processing part 404 replaces the matrix operation $U_2B_1$ (given element) with averaging processing of the respective column elements of $B_1$ to execute arithmetic processing.

That is, the calibration matrix calculation processing part 404 replaces the arithmetic processing using the orthogonal vectors in the arithmetic processing of the matrix $M_{11}$, the matrix $M_{12}$, the matrix $M_{21}$, and the matrix $M_{22}$ with averaging processing to execute the averaging (that is, averaging processing is executed on the respective given elements of the plurality of given matrixes).

Then, the calibration matrix calculation processing part 404 repetitively estimates the matrix $M_{11}$, the matrix $M_{12}$, the matrix $M_{21}$, and the matrix $M_{22}$, which have been subjected to the averaging processing, from the mutual relationship of the matrix $N_{11}$, the matrix $M_{12}$, the matrix $M_{21}$, and the matrix $M_{22}$. Thereafter, the calibration matrix calculation processing part 404 estimates the calibration matrix M(hat) by using the matrix $M_{11}$(hat), the matrix $M_{12}$(hat), the matrix $M_{21}$(hat), and the matrix $M_{22}$(hat), which have been repetitively estimated. The other components of the calibration device 400 are identical with those of the calibration device 100 of the first embodiment and the calibration device 200 of the second embodiment.

As described above, according to the calibration device of the fourth embodiment, the matrix operation of the orthogonal vectors in the second embodiment is replaced with averaging processing. As a result, the operation scale can be reduced as compared with the calibration device 200 of the second embodiment, and the manufacturing costs can be more reduced.

The respective functions 302, 307, and 308 of the calibration device 300 according to the third embodiment can be applied to the calibration device 400 of the fourth embodiment.

Further, in the first to fourth-embodiments, an example in which the plurality of sensors configure the array antenna is described. However, the plurality of sensors are not limited to the array antenna, but may be a plurality of frequency observation sensors or a plurality of polarization sensors, for example. In this case, the array mode vectors $a(\theta)$ in the first to fourth embodiments may be a mode vector corresponding to the characteristics of the plurality of sensors.

Further, in the first, third, and fourth embodiments, the array mode vectors $a(\theta)$ are stored in the database parts 103 and 403 in advance. However, the present invention is not limited to this example, and the array mode vectors $a(\theta)$ may not be stored in the database in advance and may be sequentially calculated. That is, each of the calibration matrix calculation processing parts 104, 304, and 404 may further include a function of the mode vector association processing part. In this case, the use capacity of a storage device (ROM, etc.) that constitutes the database parts 103 and 403 can be reduced, and the device scale can be reduced.

The invention claimed is:

1. A calibration device for calibrating observation data received by a plurality of sensors, the calibration device comprising:
    an observation data vector generation processing part that receives the observation data from the plurality of sensors to generate an observation data vector from the received observation data;
    a mode vector association processing part capable of calculating or storing in advance a mode vector corresponding to the observation data vector, and of calculating or storing in advance a Fourier coefficient for calculating an orthogonal vector to the mode vector; and
    a calibration parameter calculating part that acquires the observation data vector from the observation data vector generation processing part, acquires the mode vector and the Fourier coefficient corresponding to the acquired observation data vector from the mode vector association processing part, calculates the orthogonal vector to the mode vector from the acquired mode vector and the acquired Fourier coefficient, and calculates a plurality of calibration parameters for calibrating an observation error included in the observation data vector from the calculated orthogonal vector and the observation data vector.

2. A calibration device according to claim 1,
wherein the calibration parameter calculating part calculates a calibration matrix, which includes the plurality of calibration parameters and is divided into a plurality of given matrixes in advance, and
wherein the calibration parameter calculating part repetitively estimates each of the plurality of given matrixes from a mutual relationship of the plurality of given matrixes, and estimates the calibration matrix by using the plurality of given matrixes which have been repetitively estimated.

3. A calibration device according to claim 1, further comprising a correlation matrix calculating part that calculates a correlation matrix of a plurality of pieces of observation data received by the plurality of sensors, and extracts a given matrix element included in the calculated correlation matrix,
wherein the calibration parameter calculating part corrects the observation data vector by using the given matrix element extracted by the correlation matrix calculating part.

4. A calibration device according to according to claim 2, further comprising a correlation matrix calculating part that calculates a correlation matrix of a plurality of pieces of observation data received by the plurality of sensors, and extracts a given matrix element included in the calculated correlation matrix,
wherein the calibration parameter calculating part corrects the observation data vector by using the given matrix element extracted by the correlation matrix calculating part.

5. A calibration device according to claim 1, wherein the observation data vector generation processing part generates the observation data vector based on a single signal of an angle parameter in the observation data.

6. A calibration device according to claim 1, wherein:
the plurality of sensors includes an array antenna; and
the calibration parameter calculating part calculates the plurality of calibration parameters for calibrating the observation error in an angle measuring device that uses the array antenna.

7. A calibration device according to claim 1, wherein:
the plurality of sensors includes a plurality of sensors that observe a plurality of frequencies; and
the calibration parameter calculating part calculates the plurality of calibration parameters for calibrating the observation error in a ranging device that uses the plurality of sensors that observe the plurality of frequencies.

8. A calibration device according to claim 1, wherein:
the plurality of sensors includes a plurality of polarization sensors; and
the calibration parameter calculating part calculates the plurality of calibration parameters for calibrating the observation error in an observation device that uses the plurality of polarization sensors.

* * * * *